(12) United States Patent
Teodoro et al.

(10) Patent No.: US 10,348,760 B2
(45) Date of Patent: Jul. 9, 2019

(54) INTEGRATED USER CHALLENGE PRESENTATION FOR DDOS MITIGATION SERVICE

(71) Applicant: Verisign, Inc., Reston, VA (US)

(72) Inventors: Mark Teodoro, Reston, VA (US); Sean Leach, Reston, VA (US)

(73) Assignee: VERISIGN, INC., Reston, VA (US)

( * ) Notice: Subject to any disclaimer, the term of this patent is extended or adjusted under 35 U.S.C. 154(b) by 729 days.

(21) Appl. No.: 13/657,083

(22) Filed: Oct. 22, 2012

(65) Prior Publication Data

US 2014/0115669 A1  Apr. 24, 2014

(51) Int. Cl.
*H04L 12/06* (2006.01)
*H04L 29/06* (2006.01)

(52) U.S. Cl.
CPC ................ *H04L 63/1458* (2013.01)

(58) Field of Classification Search
CPC ....... H04L 63/08; H04L 63/102; H04L 63/10; H04W 12/06
USPC ......... 713/168–174, 182–186, 202; 729/225, 729/229; 726/2–8; 709/225, 229
See application file for complete search history.

(56) References Cited

U.S. PATENT DOCUMENTS

| 7,203,560 | B1 * | 4/2007 | Wylie | ................ | G05B 23/0283 |
| | | | | | 700/110 |
| 7,383,570 | B2 | 6/2008 | Pinkas et al. | | |
| 2002/0120853 | A1 * | 8/2002 | Tyree | .................. | H04L 63/1458 |
| | | | | | 713/188 |
| 2007/0271466 | A1 | 11/2007 | Mak et al. | | |
| 2008/0209223 | A1 | 8/2008 | Nandy et al. | | |
| 2010/0031315 | A1 | 2/2010 | Feng et al. | | |
| 2010/0162357 | A1 * | 6/2010 | Chickering et al. | ............... | 726/3 |
| 2011/0072516 | A1 | 3/2011 | Cohen et al. | | |
| 2011/0185311 | A1 | 7/2011 | King | | |
| 2011/0270969 | A1 | 11/2011 | Noh et al. | | |
| 2011/0296509 | A1 * | 12/2011 | Todorov | .................. | G06F 21/36 |
| | | | | | 726/7 |
| 2012/0090028 | A1 | 4/2012 | Lapsley et al. | | |

FOREIGN PATENT DOCUMENTS

KR  10-2011-0059963  6/2011

OTHER PUBLICATIONS

"DDoS Mitigation to the Rescue", Business Communication Services (BCS), vol. 4, No. 4, Mar. 2010, pp. 1-13.

(Continued)

*Primary Examiner* — Evans Desrosiers
(74) *Attorney, Agent, or Firm* — Artegis Law Group, LLP

(57) ABSTRACT

Systems and methods are disclosed for providing distributed denial-of-service (DDoS) mitigation service. The systems and methods may receive a request to access a web server from a user host, generate an integrated user challenge page including a user challenge test and a web page image of the web server, and transmits the integrated user challenge page to the user host. The systems and methods may further receive an answer to the user challenge test from the user host, determine whether the answer to the user challenge test is correct or not. When the answer to the user challenge test is correct, the systems and methods may establish a connection between the user host and the web server.

31 Claims, 3 Drawing Sheets

(56) References Cited

OTHER PUBLICATIONS

Mathew Tanase, "Closing the Floodgates: DDoS Mitigation Techniques", http://www.symantec.com/connect/articles/closing-floodgates-ddos-mitigation-techniques, downloaded Oct. 22, 2012, pp. 1-3.
"Denial-Of-Service Attack", http://en.wikipedia.org/wiki/Denial-of-service_attaack, downloaded Oct. 22, 2012, pp. 1-12.
Longe, O.B. et al., "Checking Internet Masquerading using Multiple CAPTCHA Challenge-Response Systems", ICAST 2009—2nd International Conference on Adaptive Science and Technology, 2009, pp. 244-249.
M. Mehra et al., "Mitigating Denial of Service attack using CAPTCHA mechanism", Proceedings of the International Conference & Workshop on Emerging Trends in Technology (ICWET 2011). ACM, New York, NY, USA, pp. 284-287.
Srikanth Kandula et al, "Botz-4-Sate: Surviving Organized DDoS Attacks That Mimic Flash Crowds", Proceedings of the 2nd conference on Symposium on Networked Systems Design \& Implementation—vol. 2 (NSDI 2005), vol. 2. USENIX Association, Berkeley, CA, USA, pp. 287-300.
Extended European Search Report dated Jan. 20, 2014, European Application No. 13189477.6 filed Oct. 21, 2013, pp. 1-7.

\* cited by examiner

INTEGRATED USER CHALLENGE PRESENTATION FOR DDOS MITIGATION SERVICE

TECHNICAL FIELD

This disclosure is generally directed to systems and methods for providing DDoS mitigation service. More particularly, this disclosure is directed to systems and methods for presenting integrated user challenge page for DDoS mitigation service.

BACKGROUND

A distributed denial-of-service (DDoS) attack is a malicious attempt to make a web server unavailable to its intended users. In particular, a DDoS attacker may temporarily or indefinitely interrupt or suspend services of the web server connected to a network by sending large amount of automated and malicious requests to the web server.

In order to protect the web server from the DDoS attack, a DDoS mitigation service is enabled to issue a user challenge to users, such as Completely Automated Public Turing test to tell Computers and Humans Apart ("CAPTCHA"), allowing human users to proceed while blocking the automated requests.

Contemporary methods may present a user challenge page including only a user challenge test, while forcing the web server to serve requests before the user complete the challenge. But the user challenge page does not appear to be part of the web page the user is expected to see. As a result, the user may be confused and may not respond to the user challenge. Consequently, traffic from legitimate users may be undesirably lost.

The disclosed systems and methods for presenting integrated user challenge page for DDoS mitigation service are directed to overcoming one or more of the problems set forth above, as well as other problems of the prior art.

SUMMARY

Disclosed embodiments are directed to systems and methods for presenting integrated user challenge page for DDoS mitigation service.

In one aspect, a system for providing DDoS mitigation service is provided. The system may include a user challenge processing module configured to generate a user challenge test when a request to access a web server is received from a user host, transmit an integrated user challenge page to the user host, process an answer received from the user host, and determine whether the answer is correct or not. The system may also include a user challenge page generating module configured to generate the integrated user challenge page, which includes both the user challenge test and a web page image of the web server. The system may further include a web server accessing module configured to, when the answer received from the user host is correct, establish a connection between the user host and the web server.

In another aspect, a computer-implemented method for providing DDoS mitigation service is provided. The method include receiving a request to access a web server from a user host, generating an integrated user challenge page including a user challenge test and a web page image of the web server, transmitting the integrated user challenge page to the user host, receiving an answer to the user challenge test from the user host, determining whether the answer to the user challenge test is correct or not; and when the answer to the user challenge test is correct, establishing a connection between the user host and the web server.

In still another aspect, a non-transitory computer readable medium is provided. The non-transitory computer readable medium may include instructions for providing DDoS mitigation service that, when executed by one or more processors, enable the one or more processors to receive a request to access a web server from a user host, generate an integrated user challenge page including a user challenge test and a web page image of the web server, transmit the integrated user challenge page to the user host, receive an answer to the user challenge test from the user host, determine whether the answer to the user challenge test is correct or not, and when the answer to the user challenge test is correct, establish a connection between the user host and the web server.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
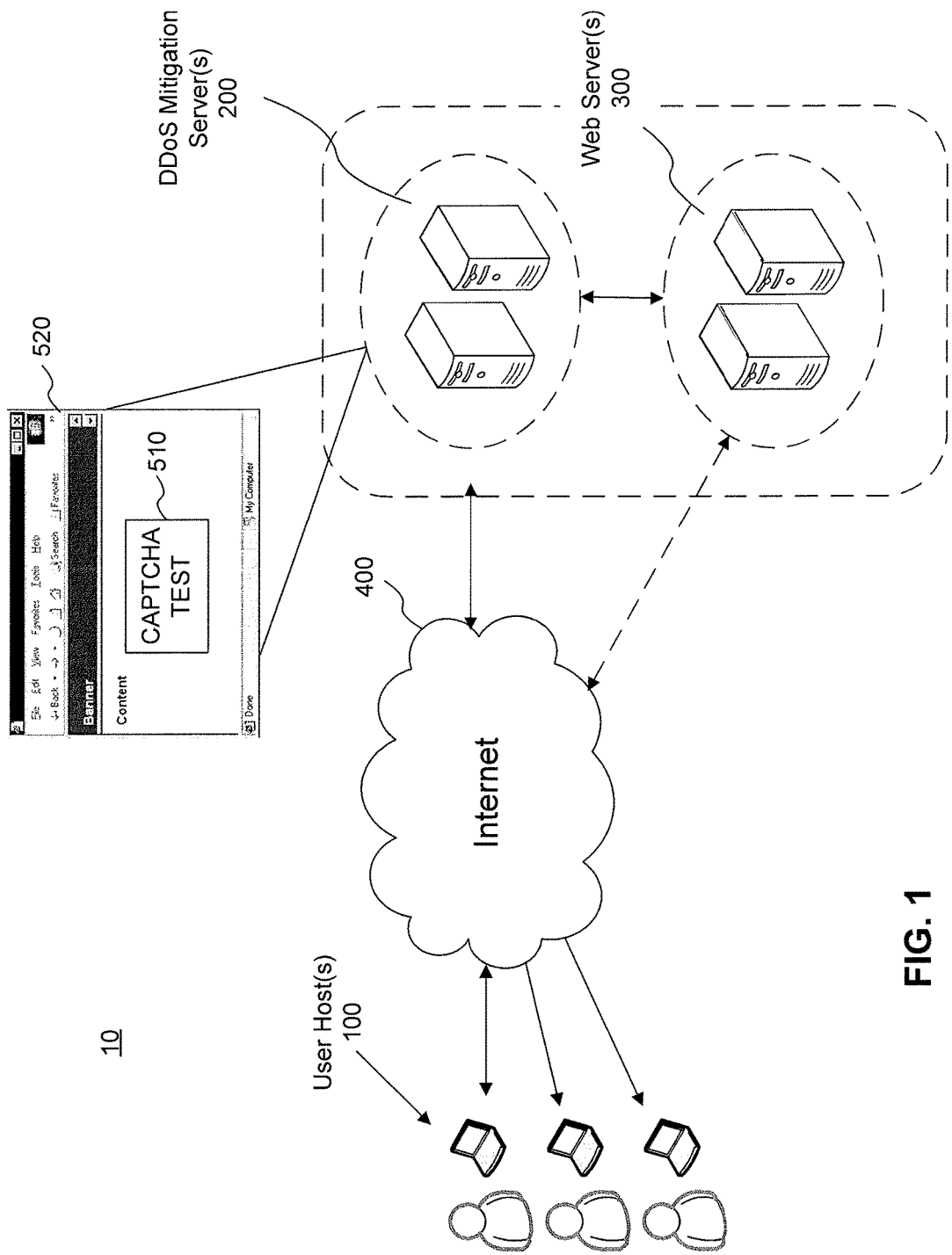
FIG. 1 is a block diagram of a system for providing DDoS mitigation service, according to an exemplary embodiment.

FIG. 1 is a block diagram of a system 10 for providing a DDoS mitigation service, according to an exemplary embodiment. Referring to FIG. 1, the system 10 for providing the DDoS mitigation service may include one or more user hosts 100, one or more DDoS mitigation servers 200, and one or more web servers 300 that are connected through a network, such as Internet 400. The user host 100, the DDoS mitigation server 200, and the web server 300 may comprise one or more of various types of computers, such as a personal computer, laptop computer, portable computer, tablet PC, a server, a mainframe computer, or any combination of these components capable of employing one or more processors, memory, input/output (I/O) devices, and storage. In some embodiments, the DDoS mitigation server 200 and/or the web server 300 may include a cluster of servers capable of performing distributed computing. The employed processors may include one or more known processing devices, such as a microprocessor from the Pentium™ or Xeon™ family manufactured by Intel™, the Turion™ family manufactured by AMD™, or any of various processors manufactured by Sun Microsystems. The employed memory may include one or more storage devices configured to store information used by the processor to perform certain functions related to disclosed embodiments. The employed storage may include a volatile or non-volatile, magnetic, semiconductor, tape, optical, removable, non-removable, or other type of storage device or computer-readable medium configured to store programs and/or other information, such as one or more predictive routing programs and any other information used to for providing the DDoS mitigation service.

The DDoS mitigation server 200 is disposed at a front end of the web server 300 and intercepts the requests to access the web server 300. The DDoS mitigation server 200 may communication with the web server 300 using a direct communications link or a communications link separate from the Internet. Those skilled in the art will appreciate that DDoS mitigation server 200 may also communicate with web server 300 via an indirect network connection, such as a network connection through the Internet. The DDoS mitigation server 200 may be within a network path between the user host 100 and the web server 300 or may be outside the path. Although in the present exemplary embodiment shown in FIG. 1, the DDoS mitigation server 200 is disposed at the front end of the web server 300, those skilled in the art will appreciate that the DDoS mitigation server 200 may be located elsewhere, including within the same system with the web server 300. In response to a request to access the web server 300 from a user host 100, the DDoS mitigation server 200 may generate a user challenge test 510, such as a CAPTCHA test, and transmits an integrated user challenge page to the user host 100. The integrated user challenge page includes a web page image 520 that appears to be displayed by the web server 300 and the user challenge test 510 generated by the DDoS mitigation server 200.

Figure 2:
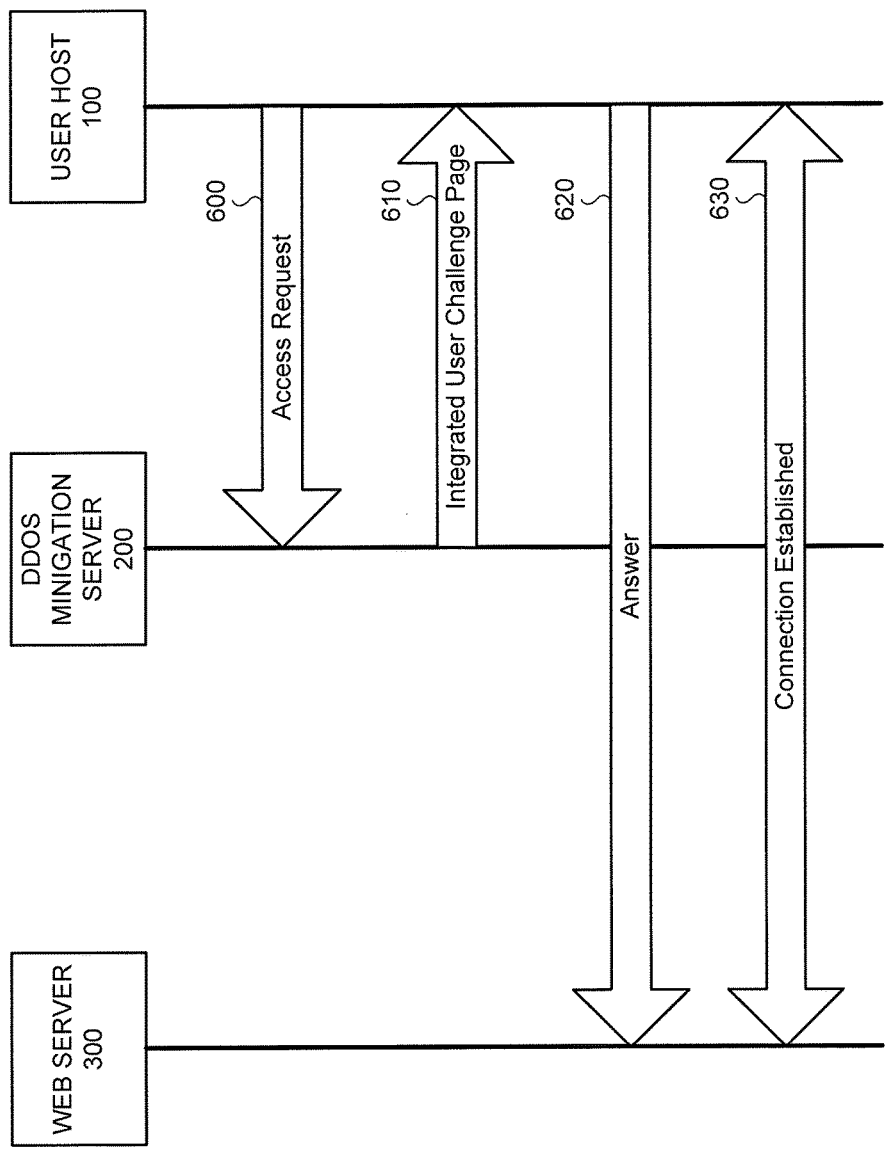
FIG. 2 illustrates access traffic flow between a user host and a web server according to an exemplary embodiment.

FIG. 2 illustrates access traffic flow between the user host 100, the DDoS mitigation server 200, and the web server 300, according to an exemplary embodiment.

Referring to FIG. 2, a user at the user host 100 may first transmit a request to access the web server 300 (step 600). In the present disclosure, the DDoS mitigation server 200 may be in the forward path from the user host 100 to the web server 300. The DDoS mitigation server 200 may receive the request transmitted by the user host 100 to access the web server 300.

In response to the request transmitted by the user host 100 to access the web server 300, the DDoS mitigation server 200 may transmit an integrated user challenge page including a user challenge test to the user host 100 (step 610).

In the integrated user challenge page of the present exemplary embodiment, the user challenge test may appear to be integrated with an image of the web page of the web server 300. For example, the user challenge test may appear in front of a semitransparent version of the web page expected by a user.

The user challenge test may be a CAPTCHA test that requests the user to complete a simple test that DDoS mitigation server 200 is able to grade. The CAPTCHA test is designed to be easy for a computer to generate, but difficult for a computer to solve. Thus, if a correct solution to the test is received, it can be presumed to have been entered by a human user. A common type of CAPTCHA requires the user to type letters or digits from a distorted image appearing on the screen. In another aspect of the invention, the user host 100 may be subjected to multiple challenges of various types in an incremental fashion.

When the user challenge page is received at the user host 100, the user host 100 may submit an answer, which is passed through the DDoS mitigation server 200 to the web server 300 (step 620).

Then, the DDoS mitigation server 200 may determine whether the answer submitted by the user host 100 is correct. If the answer submitted by the user host 100 is correct, the DDoS mitigation server 200 may establish a connection between the user host 100 and the web server 300 (step 630). As a result, the web server 300 may receive and respond to requests transmitted from the user host 100.

Figure 3:
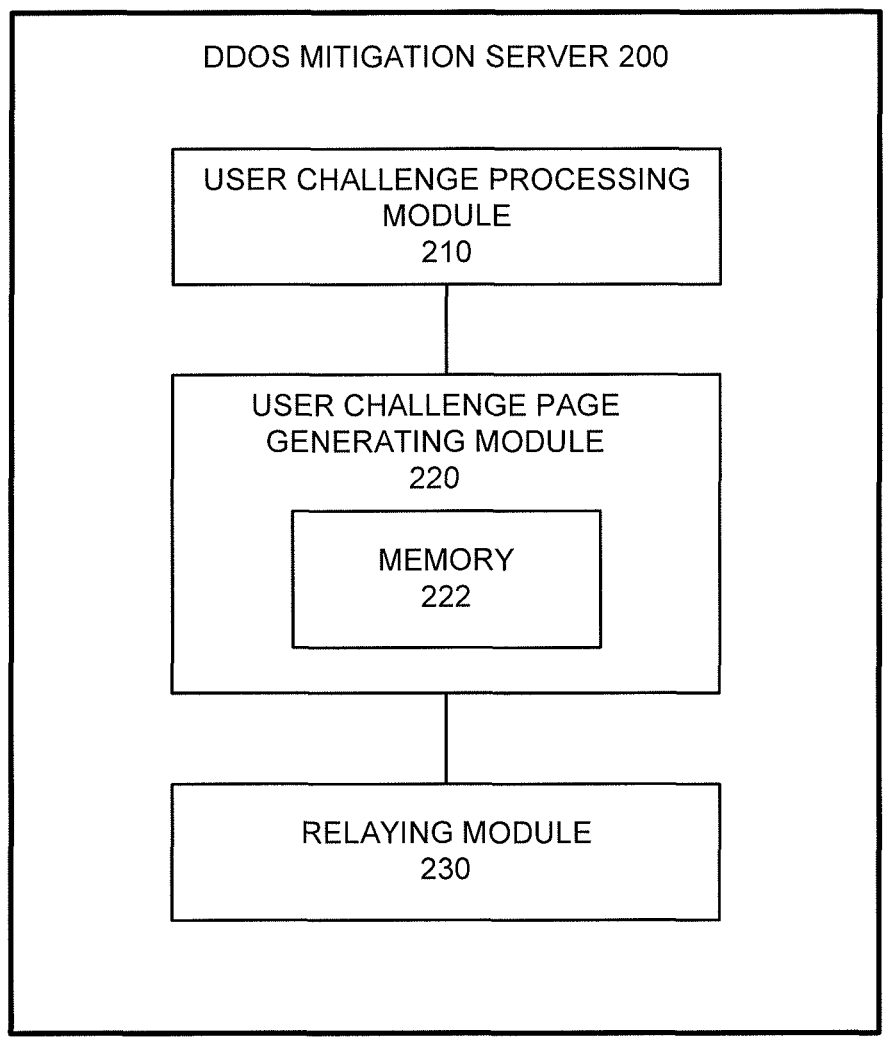
FIG. 3 is a block diagram of a DDoS mitigation server, according to an exemplary embodiment.

FIG. 3 is a block diagram of the DDoS mitigation server 200, according to an exemplary embodiment Referring to FIG. 3, the DDoS mitigation server 200 may include a user challenge processing module 210, a user challenge page generating module 220, and a web server accessing module 230.

The user challenge processing module 210 may be configured to generate a user challenge test when a request to access the web server 300 is received from the user host 100, transmit an integrated user challenge page to the user host 100, process an answer received from the user host 100, and determine whether the answer is correct or not.

The user challenge page generating module 220 may be configured to generate the integrated user challenge page, which includes both the user challenge test and an image of the web page of the web server 300. The user challenge page generating module 220 may include a memory 222 configured to store information used by the user challenge page generating module 220 to perform certain functions related to disclosed embodiments.

In an exemplary embodiment, the user challenge page generating module 220 may receive a snapshot of the web page, i.e., a web page image, of the web server 300 and may cache the snapshot in the memory 222. The user challenge page generating module 220 may generate the integrated user challenge page including both of the snapshot and the user challenge test.

In some embodiments, the snapshot may be a static web page image. The static web page may include resources like HyperText Markup Language (HTML), Cascading Style Sheets (CSS), and images that do not change per-user. The static web page may be cached by a system that didn't generate the static web page. The static web page image may be generated based on the user's own operating system (OS) or browser. The static web page image may be resource-intensive to present, but may look more realistic to the user because it is rendered by the user's own OS/browser.

In other embodiments, the snapshot may be a rendered web page image. The rendered web page image is a "screenshot" of the web page as it appears in a given operating system (OS) or a given browser. The rendered web page image may be simple to present but will only look realistic to a user with a similar OS/browser combination to the system the rendered image was generated on.

In certain embodiments, the snapshot may be rendered by using different combinations of browsers and/or operating systems (OSs). The rendered image may be blurred or a more generic version of the web page image may be presented, and the user challenge test may be overlaid on top of the web page image.

In certain embodiments, the user challenge page generating module 220 may receive the snapshot when the system 10 is initialized, and may store the received snapshot in the memory 222. The user challenge page generating module 220 may refresh the snapshot in the memory 222 by receiving a new snapshot, and replacing the snapshot in the memory 222 with the new snapshot. For example, the snapshot may be refreshed at a configurable interval and/or at a specified time. For another example, the snapshot may be refreshed when a change is observed in a sampled response traffic. For yet another example, the snapshot may also be refreshed on demand by customer request.

The web server accessing module 230 may operate to establish a connection between the user host 100 and the web server 300 once a correct answer to the user challenge test submitted by the user host 100 is received.

Although in the present exemplary embodiment shown in FIG. 3, the user challenge processing module 210, the user challenge page generating module 220, and the web server accessing module 230 are located in the same physical system, those skilled in the art will appreciate that the user challenge processing module 210, the user challenge page generating module 220, and the web server accessing module 230 may be located in different physical systems, or even in different data centers. For example, the user challenge page generating module 220 for generating the integrated user challenge page may be located at the DDoS mitigation server 200, but the user challenge processing module 210 for verifying the answer transmitted by the user host 100 may be located in the web server 300. For another example, the user challenge page generating module 220 may be located at the user host 100, and the user challenge verification module 230 may be located in the DDoS mitigation server 200.

The systems and methods according to an embodiment of the present disclosure may also handle requests from a Malware detection web site detecting and monitoring applications looking like a malware attack, such as a man-in-the-middle attack, without the insertion of the integrated challenge. The man-in-the-middle attack in cryptography and computer security is a form of active eavesdropping in which the attacker makes independent connections with the victims and relays messages between them, making them believe that they are talking directly to each other over a private connection, when in fact the entire conversation is controlled by the attacker. Request handling is achieved by the DDOS Mitigation Server 200 pre-registering with the Malware detection application. During a DDOS mitigation process, the Malware detection requests will be coming from the DDOS Mitigation Server on behalf of the customer web site, but because the DDOS Mitigation server is already on the Malware application's white-list, it will be able to distinguish the mitigation from a man-in-the-middle attack.

The systems and methods according to an embodiment of the present disclosure may build in additional logic to apply the user-challenge in the event of a DDOS mitigation. For example, the DDOS Mitigation Server 200 may apply the user challenge to one or more attributes of the query, such as certain ranges of IP address of the originator of the query, whilst allowing the remaining queries to go through without the challenge. This would help the DDOS mitigation Server 200 to target an attack traffic that is coming from a certain geographic or network topology region.

In another embodiment of the present disclosure, in the case where the DDOS Mitigation Server 200 is indefinitely receiving traffic on behalf of the customer web site, the DDOS Mitigation Server 200 can integrate with other value added services. For example, if the customer web site does not maintain Mobile Browser based versions of its content, the DDOS Mitigation Server 200 could be integrated with a utility that detects the device and browser of the source of the query, and render a version of the web page, complete with the user challenge overlay, which is tailored for optimal display on the user device.

According to the above embodiments, because the user receives an integrated user challenge page in which a user challenge test appears to be presented on a web page of the web server that the user is attempting to access, the user would not miss the chance to answer the user challenge test, and thus traffic from legitimate users would not be lost.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system or existing browser software.

Other embodiments of the invention will be apparent to those skilled in the art from consideration of the specification and practice of the invention disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A system for providing distributed denial-of-service (DDoS) mitigation service, the system comprising:
 a memory storing instructions;
 a processor, operably connected to the memory, that executes the instructions to perform operations comprising:
  receiving, from a web server, an image of a web page of the web server;

intercepting, from a user device, a request to access the web server;

generating an integrated user challenge page comprising a user challenge test and the image of the web page, wherein the image of the web page comprises an image of at least a portion of the web page;

transmitting, prior to establishing any connection between the user device and the web server, the integrated user challenge page to the user device;

processing an answer to the user challenge test received from the user device; and determining whether the answer is correct.

2. The system of claim 1, wherein the user challenge test is overlaid on and at least partially obscures the image of the web page.

3. The system of claim 1, wherein the image of the web page is blurred in the integrated user challenge page.

4. The system of claim 1, wherein the image of the web page is a static web page.

5. The system of claim 1, wherein the image of the web page is a rendered web page.

6. The system of claim 1, wherein the system further includes instructions that perform operations comprising:
receiving the image of the web page when the system is initialized; and
storing the received web page image in the memory.

7. The system of claim 6, wherein the system further includes instructions that perform operations comprising refreshing the image of the web page.

8. The system of claim 7, wherein the refreshing the image of the web page comprises refreshing the image of the web page at a configurable interval.

9. The system of claim 7, wherein the refreshing the web page image comprises refreshing the image of the web page at a specified time.

10. The system of claim 7, wherein the refreshing the web page image comprises refreshing the image of the web page when a change is observed in a sampled response traffic.

11. The system of claim 7, wherein the refreshing the web page image comprises refreshing the image of the web page on demand by a request.

12. The system of claim 1, wherein the generating the user challenge test only when the user device requesting to access the web server has one of a plurality of predetermined IP addresses.

13. The system of claim 1, wherein the system further includes instructions that perform operations comprising:
determining a type of a browser used by the user device; and
generating the integrated user challenge page in accordance with the browser type of the user device.

14. A computer-implemented method for providing distributed denial-of-service (DDoS) mitigation service, the method comprising:
receiving, from a web server, a web page image;
intercepting, from a user device, a request to access the web server;
receiving a request to access a web server from a user device;
generating an integrated user challenge page including a user challenge test and the web page image, wherein the web page image comprises an image of at least a portion of a web page that the user device is requesting to access;
transmitting, prior to establishing any connection between the user device and the web server, the integrated user challenge page to the user device;
receiving an answer to the user challenge test from the user device; and
determining whether the answer to the user challenge test is correct.

15. The computer-implemented method of claim 14, wherein the user challenge test is overlaid on the web page image in the integrated user challenge page.

16. The computer-implemented method of claim 14, wherein the web page image is blurred in the integrated user challenge page.

17. The computer-implemented method of claim 14, wherein the web page image is a static web page.

18. The computer-implemented method of claim 14, wherein the web page image is a rendered web page.

19. The computer-implemented method of claim 14, further comprising receiving the web page image, and storing the received web page image in the memory.

20. The computer-implemented method of claim 19, further including refreshing the web page image stored in the memory.

21. The computer-implemented method of claim 20, wherein the web page image is refreshed at a configurable interval.

22. The computer-implemented method of claim 20, wherein the web page image is refreshed at a specified time.

23. The computer-implemented method of claim 20, wherein the web page image is refreshed when a change is observed in sampled response traffic.

24. The computer-implemented method of claim 20, wherein the web page image is refreshed on demand by a request.

25. The computer-implemented method of claim 14, further including:
determining whether an IP address of the user device belongs to a plurality of predetermined IP addresses; and
generating the integrated user challenge page only when the IP address of the user device belongs to the plurality of predetermined IP addresses.

26. The computer-implemented method of claim 14, further including:
determining a type of a browser used by the user device; and
generating the integrated user challenge page in accordance with the browser type of the user device.

27. A non-transitory computer readable medium comprising:
instructions for providing distributed denial-of-service (DDoS) mitigation service that, when executed by one or more processors, control the one or more processors to:
receive, from a web server, a web page image;
receive a request to access the web server from a user device;
generate an integrated user challenge page including a user challenge test and the web page image of the web server, wherein the web page image comprises an image of at least a portion of a web page that the user device is requesting to access;
transmit, prior to establishing any connection between the user device and the web server, the integrated user challenge page to the user device;
receive an answer to the user challenge test from the user device; and
determine whether the answer to the user challenge test is correct.

28. The system of claim 1, wherein the user challenge test is in front of a transparent or semitransparent version of the web page that the user device is requesting to access.

29. The system of claim 1, wherein the image of the web page comprises a blurred version of the image of at least a portion of the web page that the user device is requesting to access.

30. The system of claim 1, wherein the image of the web page comprises a generic version of the image of at least a portion of the web page that the user device is requesting to access.

31. The system of claim 1, wherein:
the system comprises a distributed denial-of-service (DDoS) mitigation server;
the DDoS mitigation server is separate from the web server and external to the web server;
the request to access the web server is directed to the web server;
the image of the web page in the integrated user challenge page generated by the DDoS mitigation server appears to be displayed by the web server to which the user device requested access; and
the user challenge test in the integrated user challenge page generated by the DDoS mitigation server appears to be presented on the web page of the web server that the user device requested access.

* * * * *